United States Patent
Whitaker

(10) Patent No.: US 11,093,052 B2
(45) Date of Patent: Aug. 17, 2021

(54) FACETED EIGHT-DIRECTION CONTROL PAD

(71) Applicant: Microsoft Technology Licensing, LLC, Redmond, WA (US)

(72) Inventor: Ryan Eugene Whitaker, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/709,618

(22) Filed: Dec. 10, 2019

(65) Prior Publication Data

US 2021/0173495 A1 Jun. 10, 2021

(51) Int. Cl.
- *G06F 3/033* (2013.01)
- *G06F 3/0354* (2013.01)
- *H01H 21/22* (2006.01)
- *A63F 13/24* (2014.01)
- *A63F 13/23* (2014.01)

(52) U.S. Cl.
CPC ............ *G06F 3/0354* (2013.01); *A63F 13/24* (2014.09); *H01H 21/22* (2013.01); *A63F 13/23* (2014.09); *A63F 2300/1025* (2013.01); *A63F 2300/1043* (2013.01); *H01H 2231/008* (2013.01)

(58) Field of Classification Search
CPC ..................... G06F 3/0354; A63F 13/24; A63F 2300/1025; A63F 2300/1043; A63F 13/23; H01H 21/22; H01H 2231/008
See application file for complete search history.

(56) References Cited

U.S. PATENT DOCUMENTS

| | | | |
|---|---|---|---|
| 2012/0050232 A1* | 3/2012 | Ikeda | A63F 13/06 345/184 |
| 2016/0354685 A1* | 12/2016 | Kujawski | A63F 13/98 |
| 2018/0178117 A1 | 6/2018 | Kujawski et al. | |
| 2018/0353850 A1 | 12/2018 | Strahle et al. | |

FOREIGN PATENT DOCUMENTS

AU 2019100491 A4 6/2019

OTHER PUBLICATIONS

"International Search Report and Written Opinion Issued in PCT Application No. PCT/US20/059770", dated Feb. 22, 2021, 13 Pages.

* cited by examiner

*Primary Examiner* — Adam R. Giesy
(74) *Attorney, Agent, or Firm* — Ray Quinney & Nebeker P.C.; John O. Carpenter

(57) ABSTRACT

A direction control pad includes a body with a top side. The top side includes a center surface with a plurality of cardinal surfaces oriented at an angle to the center surface and a plurality of diagonal surface oriented at an angle to the center surface. The cardinal surfaces are recessed below the cardinal surfaces. Each of the cardinal surfaces connect to the center surface at a discontinuity.

20 Claims, 7 Drawing Sheets

FACETED EIGHT-DIRECTION CONTROL PAD

BACKGROUND

Background and Relevant Art

Electronic device controllers allow users to quickly provide directional inputs to a video game console or other computing device. A directional control pad provides an intuitive mechanism for users to move a cursor or provide sequences of directional inputs to activate specific actions or options in an application. Different users have different playstyles with directional control pads, resulting in conventional control pads being advantageous to certain playstyles and detrimental to others.

BRIEF SUMMARY

In some embodiments, a direction control pad includes a body with a top side. The top side includes a center surface with a plurality of cardinal surfaces oriented at an angle to the center surface and a plurality of diagonal surface oriented at an angle to the center surface. The cardinal surfaces are recessed below the cardinal surfaces. Each of the cardinal surfaces connect to the center surface at a discontinuity.

In some embodiments, an electronic device controller includes a housing having a face with an opening therein and a directional control pad positioned in the opening and movable relative to the face to receive user inputs. The directional control pad includes a body with a top side. The top side includes a center surface with a plurality of cardinal surfaces oriented at an angle to the center surface and a plurality of diagonal surface oriented at an angle to the center surface. The cardinal surfaces are recessed below the cardinal surfaces. The cardinal surfaces connect to the center surface at a discontinuity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 4-1 and 4-2 are top views of the directional control pad of FIG. 3 with a user's thumb moving between cardinal surfaces, according to at least some embodiments of the present disclosure;

FIGS. 5-1 through 5-3 are top views of the directional control pad of FIG. 3 with a user's thumb sweeping along an edge of the control pad between cardinal directions, according to at least some embodiments of the present disclosure;

FIG. 6-1 is a front cross-sectional view of a directional control pad, according to at least some embodiments of the present disclosure;

FIG. 6-2 is a side cross-sectional view of the directional control pad of FIG. 6-1;

FIG. 8-1 is a front cross-sectional view of a directional control pad in a neutral position, according to at least some embodiments of the present disclosure;

FIG. 8-2 is a front cross-sectional view of the directional control pad of FIG. 8-1 with a left direction depressed, according to at least some embodiments of the present disclosure; and FIG. 8-3 is a front cross-sectional view of the directional control pad of FIG. 8-1 with a right direction depressed, according to at least some embodiments of the present disclosure.

DETAILED DESCRIPTION

The present disclosure relates generally to systems and methods for providing user inputs to an electronic device. More particularly, the input devices described herein are configured to allow directional inputs to a computing device or a specialized video game console. In some embodiments, an input device according to the present disclosure is an electronic device controller that may be in data communication with an electronic device, such as a personal computer or video game console. In some embodiments, a controller is in data communication via a wired data connection. In other embodiments, the controlled is in wireless data communication.

Controllers include directional input devices to allow a user to indicate a direction an on-screen cursor or avatar should move relative to an environment. In some instances, an analog thumbstick is appropriate to provide directional inputs to move an avatar in a relation to a three-dimensional virtual environment. For example, the analog thumbstick allows a gradient of input magnitudes with an associated directional component that allows for control of an avatar from a slow walk through a full run in the virtual environment.

In other instances, a cross-shaped directional control pad is appropriate to provide discrete directional control. For example, an analog input device can be unpredictable for a user in a menu selection screen with discrete options. Inputs from the analog input device may produce no movement of a cursor between the discrete options until a threshold of the analog input device is met, at which point the cursor may move unexpectedly, producing imprecise control for the user. In other examples, some applications and video games interpret series of discrete directional inputs as special commands that evoke unique techniques of the user's avatar or unlock additional features of the application or video game. In at least one example, a fighting video game interprets a precise series of directional inputs as a special command to attack using a projectile attack. In other examples, a particular series of directional inputs provided by a user at a menu screen unlocks additional options or resources.

Figure 1:
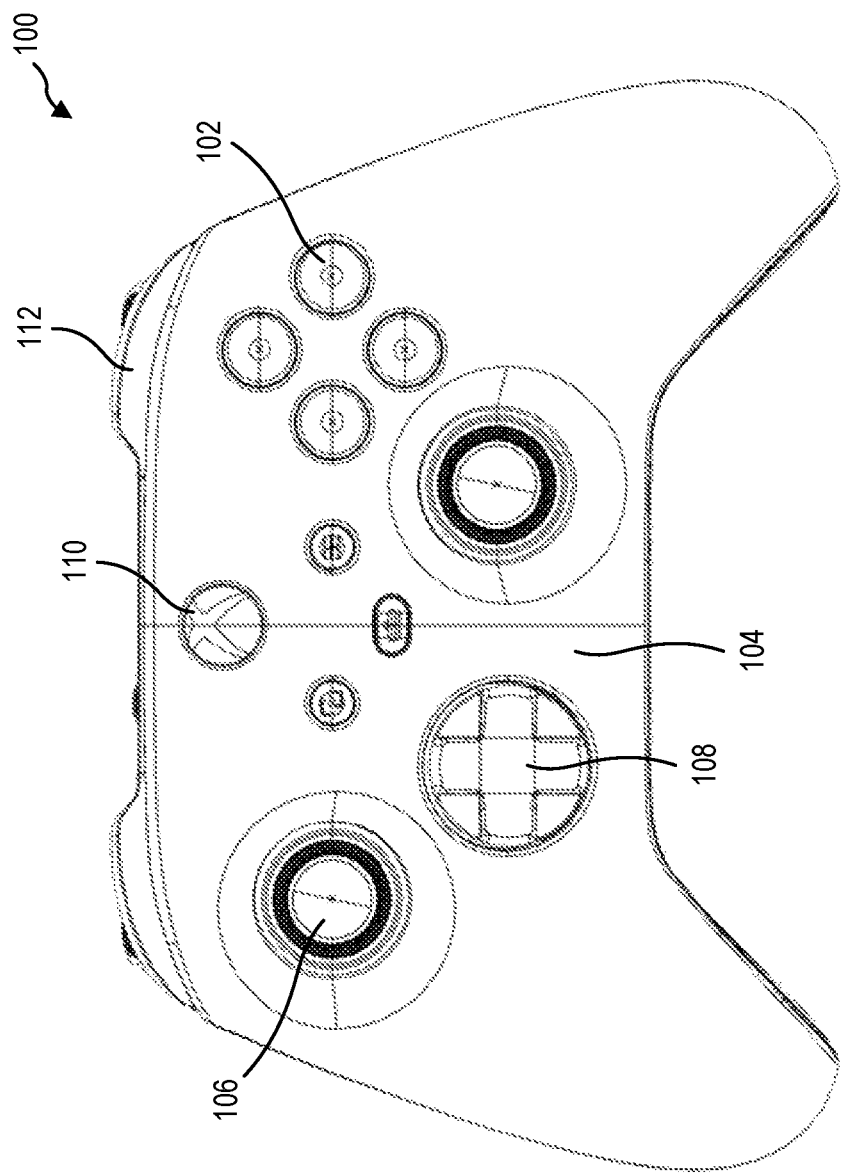
FIG. 1 is a top view of a electronic device controller, according to at least some embodiments of the present disclosure.

Referring now to FIG. 1, in some embodiments, an electronic device controller 100 includes a plurality of other input buttons 102 located on a face 104 of the controller 100 with the directional input devices. The directional input devices may include one or more analog thumbsticks 106 and/or one or more directional control pads 108. The controller 100 may further include one or more menu or system buttons 110, shoulder buttons 112, trigger buttons, rear paddles, etc. In some embodiments, the directional control pad 108 is positioned for a user to reach the directional control pad 108 with a thumb.

In some embodiments, the directional input devices are available to be used interchangeably by a user, and in such embodiments, the directional control pad 108 may be selected by the user to provide more precise, discrete directional inputs as compared to the analog thumbstick(s) 106. The design, surface geometry, and tactile feedback of the directional control pad 108 according to the present description, therefore, provide the most different types of users with improved performance.

Figure 2:
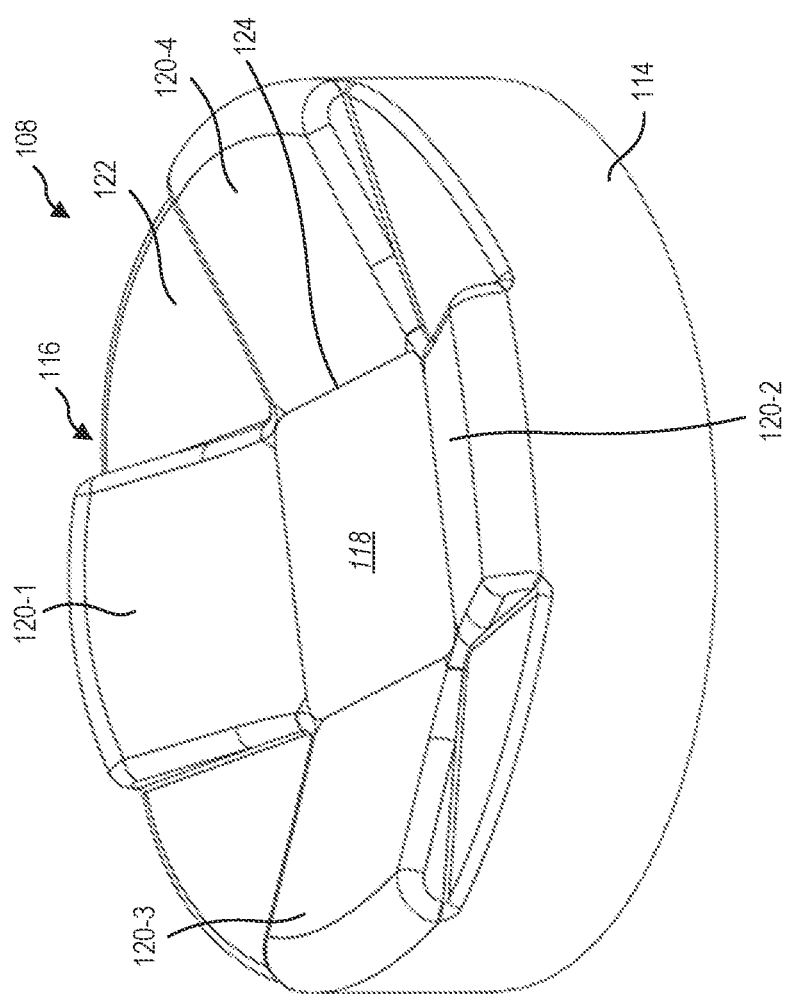
FIG. 2 is a perspective view of a directional control pad, according to at least some embodiments of the present disclosure.

A directional control pad 108 according to the present disclosure has a body 114 with a top side 116 that is pressed by the user, as shown in FIG. 2. In some embodiments, the body 114 is a cylindrical body with a circular top side 116. In other embodiments, the body 114 has other cross-sectional shapes, such as an oval, a rounded square, an octagon, or other shapes that facilitate eight-way directional inputs. When the user presses on the different surfaces of the top side 116, the directional control pad 108 tilts in the controller and transmits the movement of the directional control pad 108 to activate one or more switches and/or sensor in the controller and detect the user input.

In some embodiments, a directional control pad 108 according to the present disclosure has a center surface 118 on the top side 116 of the body 114 with a plurality of cardinal surfaces 120-1, 120-2, 120-3, 120-4 located around the center surface 118. The four cardinal surfaces 120-1, 120-2, 120-3, 120-4 are positioned at the up, down, left, and right directions relative to the center surface 118 and are each oriented at an angle to the center surface 118 such that the center surface 118 is recessed toward the body 114 relative to the cardinal surfaces 120-1, 120-2, 120-3, 120-4 on the top side 116. The top side 116 further includes four diagonal surfaces 122 that are positioned angularly between the cardinal surfaces 120-1, 120-2, 120-3, 120-4 around the center surface 118. The diagonal surfaces 122 are also oriented at an angle relative to the center surface 118 such that the center surface 118 is recessed toward the body 114 relative to the diagonal surfaces 122 on the top side 116. The diagonal surfaces 122 are at least partially recessed from the cardinal surfaces 120.

The up cardinal surface 120-1, down cardinal surface 120-2, left cardinal surface 120-3, and right cardinal surface 120-4 each connect to the center surface 118 at a discontinuity 124 or other corner between the surfaces such that the center surface 118 and cardinal surfaces 120-1, 120-2, 120-3, 120-4 do not form a smooth or continuous surface. The discontinuity between the center surface 118 and the cardinal surfaces 120-1, 120-2, 120-3, 120-4 allows tactile feedback to a user when the user's thumb (or other finger) is positioned on the directional control pad 108. By tactilely identifying the discontinuities, the user can locate their thumb relative to the center surface 118 on the directional control pad.

In some embodiments, the center surface 114 is planar. In other embodiments, the center surface 114 is concave in at least one direction. and in other embodiments, the center surface 114 is concave is two directions. In yet other embodiments, the center surface 114 is convex in at least one direction, and in other embodiments, the center surface 114 is convex is two directions.

In some embodiments, a cardinal surface 120-1, 120-2, 120-3, 120-4 is planar. It should be understood that a surface that is planar may have radiused edges while still being considered planar for the purposes of the present disclosure. For example, the top edge 128 of the cardinal surface 120-1, 120-2, 120-3, 120-4 may be rounded to prevent injury to a user, while the remainder of the cardinal surface 120-1, 120-2, 120-3, 120-4 is planar, and the cardinal surface 120-1, 120-2, 120-3, 120-4 should be understood to be planar. In other embodiments, a cardinal surface 120-1, 120-2, 120-3, 120-4 is concave in at least one direction. and in other embodiments, a cardinal surface 120-1, 120-2, 120-3, 120-4 is concave is two directions. In yet other embodiments, a cardinal surface 120-1, 120-2, 120-3, 120-4 is convex in at least one direction, and in other embodiments, a cardinal surface 120-1, 120-2, 120-3, 120-4 is convex is two directions.

In embodiments with a planar cardinal surface 120-1, 120-2, 120-3, 120-4 and a planar center surface 114, the cardinal angle is measured from the planes of the cardinal surface 120-1, 120-2, 120-3, 120-4 and the center surface 114. In embodiments with a non-planar cardinal surface and/or a non-planar, the cardinal angle is the angle immediately on either side of the discontinuity 124.

The diagonal surfaces 122 of the directional control pad 108 allow the user to press between the cardinal surfaces 120-1, 120-2, 120-3, 120-4 and provide direct pressure to a diagonal surface 122 without needing to press on the two adjacent cardinal surfaces 120-1, 120-2, 120-3, 120-4 simultaneously as in some conventional directional control pads.

In some embodiments, a diagonal surface 122 is planar. In other embodiments, a diagonal surface 122 is concave in at least one direction. and in other embodiments, a diagonal surface 122 is concave is two directions. In yet other embodiments, a diagonal surface 122 is convex in at least one direction, and in other embodiments, a diagonal surface 122 is convex is two directions.

Figure 3:
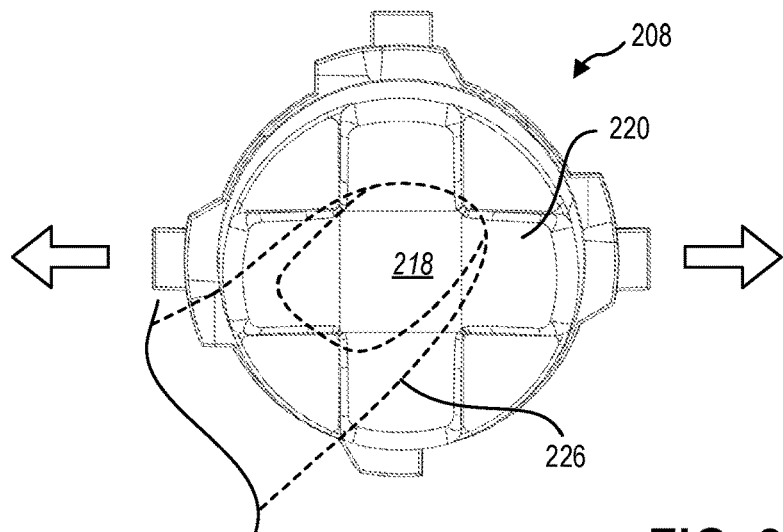
FIG. 3 is a top view of a direction control pad with a user's thumb positioned on a center surface, according to at least some embodiments of the present disclosure.
Figures 1, 5:
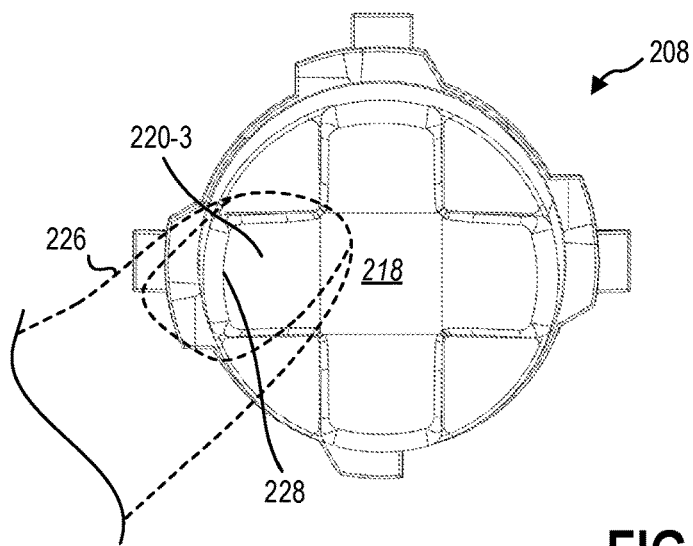
Figures 2, 5:
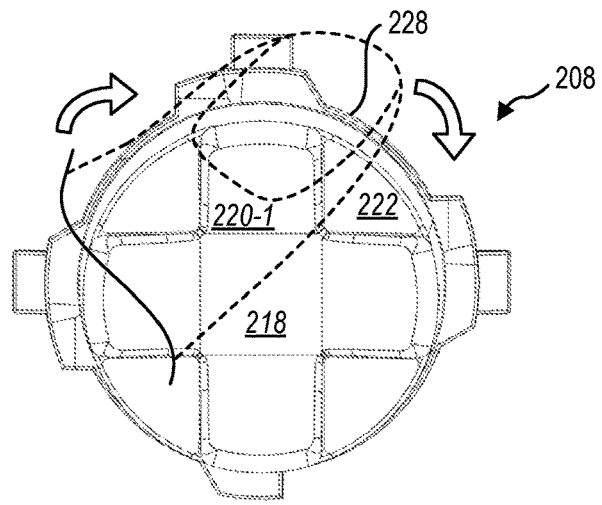
Figures 3, 5:
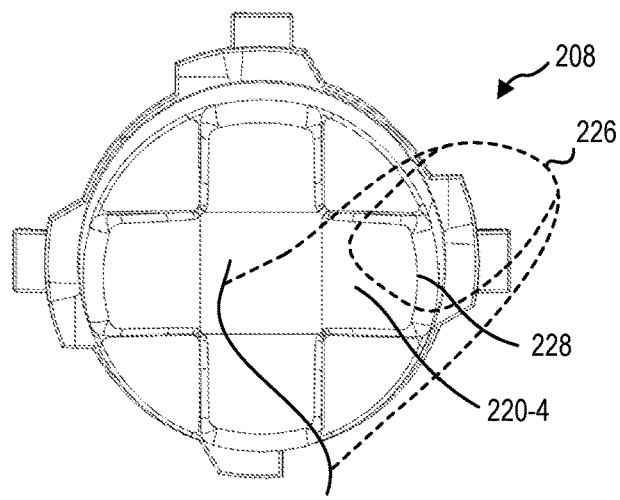

Referring now to FIG. 3-1 through 5-3, different playstyles are illustrated. Different users may utilize different playstyles, and in some instances, a user may utilize different playstyles for different genres or different situations while playing video games. Conventional directional control pad designs favor one playstyle over others. Embodiments of directional control pads according to the present disclosure are designed to provide improved control to all three of the playstyles.

FIG. 3 illustrates a "rocker" playstyle. The user positions a thumb 226 or other finger in the center of the directional control pad 208 and presses on the directional control pad

208 by rocking their thumb 226 toward the cardinal surfaces 220. The discontinuities 224 surrounding the center surface 218 described in relation to FIG. 2 are important to the rocker playstyle as precise positioning of the user's thumb 226 on the center surface 218 is the basis for accurate directional inputs to the directional control pad 208. Additionally, the high angles and deep dish of the cardinal surfaces and diagonal surfaces according to the present disclosure increase the leverage of the user's thumb 226 to limit the movement needed by the user to quickly and definitively depress the directional control pad 208 and provide a directional input. Many high-level users use the rocker playstyle to rapidly and precisely input sequences of directional inputs.

Figures 1, 4:
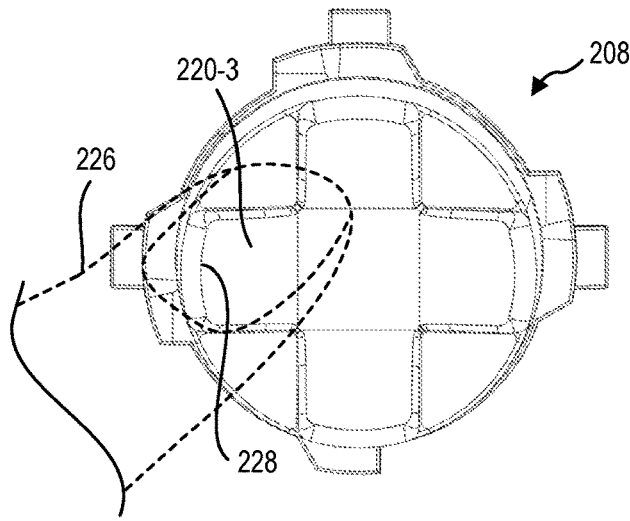
Figures 2, 4:
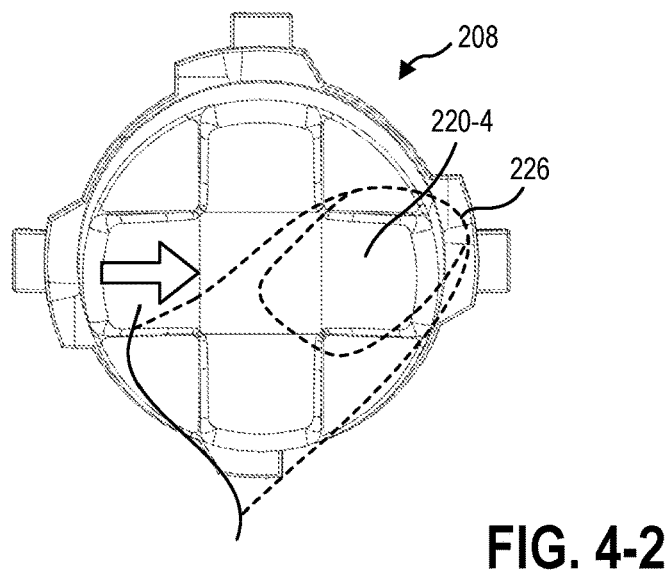

FIG. 4-1 through 4-2 illustrates a "presser" playstyle. While the rocker playstyle involves keeping the thumb 226 centered and rocking the thumb to limit the overall displacement of the thumb 226, the presser playstyle includes positioning the thumb 226 over a cardinal surface (such as the left cardinal surface 220-3) and/or a diagonal surface 222 before depressing that surface of the directional control pad 208. The user then moves the thumb 226 to a second surface (such as the right cardinal surface 220-4, as shown in FIG. 4-2), depresses that second surface, and enters a second directional input.

In the presser playstyle, the quick and reliable locating of a top edge 228 of the cardinal surface and/or the diagonal surface provides an accessible and simple method of engaging with the directional control pad 208. In some instances, less experienced players find the presser playstyle more accessible and intuitive as the presser playstyle effectively treats the directional control pad 208 as a set of individual buttons that the user can press. However, the presser playstyle may also be beneficial for simpler actions, such as menu selections or item movement in puzzle games, where rapid sequence inputs are not needed.

In some embodiments according to the present disclosure, a directional control pad 208 allows for easier identification and discernment of the cardinal surfaces 220 and diagonal surfaces 222 by presenting a relief between the cardinal surfaces 220 and the diagonal surfaces 222 to the user's thumb 226.

FIG. 5-1 through 5-3 illustrates a "sweeper" playstyle. Some users intuitively treat the directional control pad 208 as a circular directional input mechanism to provide directional inputs relative to the center surface 218. The sweeper playstyle presses the top edge 228 of the directional control pad 208 similar to as described in relation to the presser playstyle. However, in contrast, the sweeper playstyle moves the thumb 226 between directional inputs by tracing the top edge 228 as the perimeter of the directional control pad 208 between locations to press. FIG. 5-2 illustrates the movement of the user's thumb 226 along the top edge 228 from the left cardinal surface 220-3 across the top edge 228 of the up cardinal surface 220-1 and the diagonal surface 222 and down to the right cardinal surface 220-4 shown in FIG. 5-3. The user then presses on the top edge 228 of the right cardinal surface 220-4 to provide the directional input.

By providing a complete disc, but with relief between the cardinal surface(s) and the diagonal surfaces along the top edge(s), the directional control pad 208 according to the present disclosure allows a sweeper playstyle to accurate track when the user's thumb 226 is along the arc of the top edge 228. Some embodiments of a directional control pad 208 as described herein allow a different users to play and interact with video games and other computing device applications with the playstyle or combination of playstyles that is best for them and the situation.

In some examples, a directional control pad 208 according to the present disclosure allows for a combination of the described playstyles. For example, a user may use the presser playstyle on the right cardinal surface and the up cardinal surface with a rocker playstyle used for the down cardinal surface and the left cardinal surface. When interacting with the directional control pad 208 using the user's left thumb 226, such as shown in FIG. 3 through FIG. 5-3, the user's thumb 226 is positioned over the left cardinal surface and the down cardinal surface (and the diagonal surface therebetween) when positioned over the center surface. The user can easily and quickly depress the left cardinal surface and the down cardinal surface using the rocker playstyle without moving the user's thumb 226. However, it is mechanically harder for the user to provide the leverage to rock the user's thumb 226 and press the right cardinal surface and the up cardinal surface. Therefore, the user may displace their thumb 226 and press the right cardinal surface and the up cardinal surface, as described in relation to FIGS. 4-1 and 4-2.

Figures 1, 6:
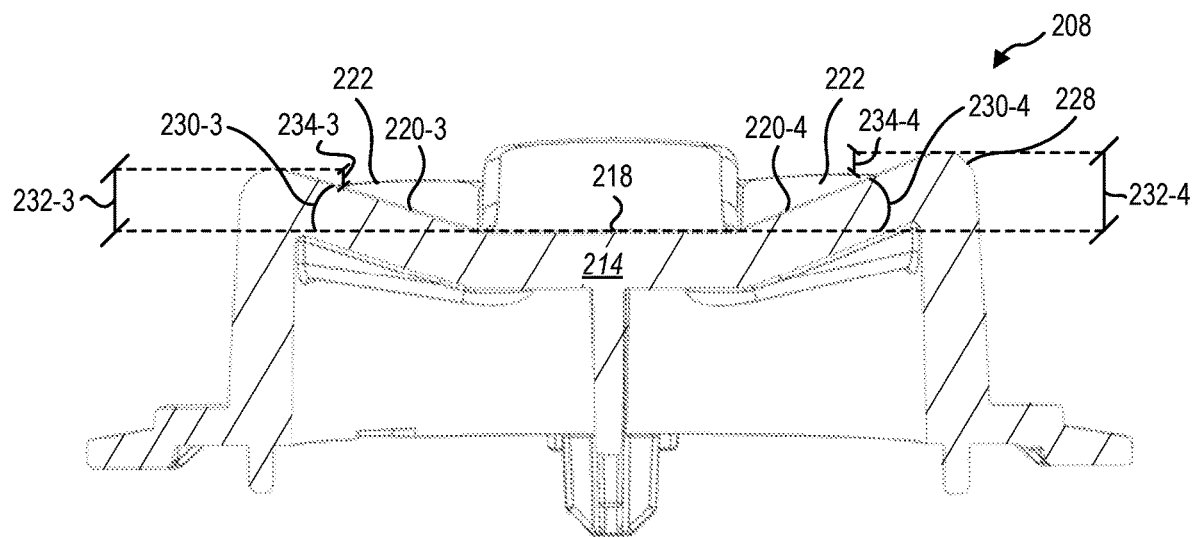
Figures 2, 6:
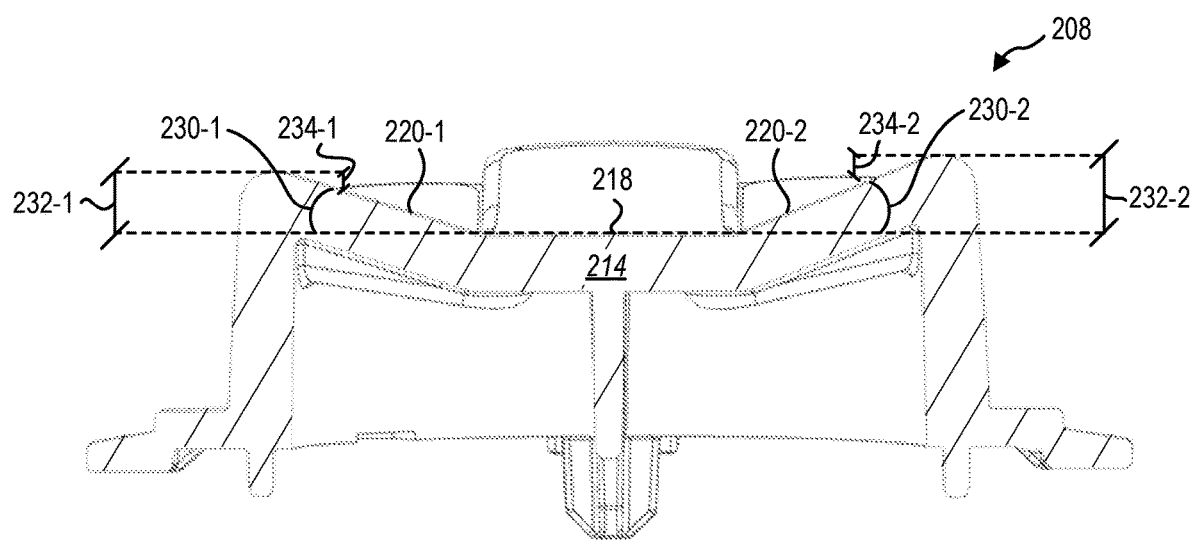

FIGS. 6-1 and 6-2 illustrate a front cross-sectional view and a side cross-sectional view, respectively, of an embodiment of the directional control pad 208. In some embodiments, the cardinal surfaces 220-1, 220-2, 220-3, 220-4 are all oriented relative to the center surface 218 at equal cardinal angles 230-1, 230-2, 230-3, 230-4. As shown in FIG. 6-1, the left cardinal surface 220-3 and the right cardinal surface 220-4 may be oriented at equal cardinal angles 230-3, 230-4 relative to the center surface 218. As shown in FIG. 6-2, the up cardinal surface 220-1 and the down cardinal surface 220-2 may be oriented at equal cardinal angles 230-1, 230-2 that are the same as the those of the left cardinal surface 220-3 and the right cardinal surface 220-4 of FIG. 6-1. In some embodiments, the cardinal angle is in a range having an upper value, a lower value, or upper and lower values including any of 15°, 20°, 25°, 30°, 35°, or any values therebetween. In some examples, the cardinal angle is greater than 15°. In some examples, the cardinal angle is less than 35°. In some examples, the cardinal angle is between 15° and 35°. In some examples, the cardinal angle is between 20° and 30°.

The cardinal surfaces 220-1, 220-2, 220-3, 220-4 each extend above the body 214 and the center surface 218 by an amount that defines a height 232-1, 232-2, 232-3, 232-4 of the cardinal surfaces 220-1, 220-2, 220-3, 220-4. The height 232-1, 232-2, 232-3, 232-4 of the cardinal surfaces 220-1, 220-2, 220-3, 220-4 is related to a depth of the directional control pad 208 into which the user's thumb may rest.

In some embodiments, a depth of the directional control pad 208 is the distance from the center surface 218 upward to the top edge 228 of the tallest cardinal surface 220-1, 220-2, 220-3, 220-4. In some embodiments, the depth of the directional control pad 208 is in a range having an upper value, a lower value, or upper and lower values including any of 0.5 millimeters (mm), 0.75 mm, 1.0 mm, 1.25 mm, 1.5 mm, 1.75 mm, 2.0 mm, 2.5 mm, or any values therebetween. In some examples, the depth is greater than 0.5 mm. In some examples, the depth is less than 2.5 mm. In some examples, the depth is between 0.5 mm and 2.5 mm. In some examples, the depth is about 2.0 mm.

In some embodiments, the diagonal surfaces 222 are all oriented relative to the center surface 214 at equal diagonal angles similar to as described in relation to the cardinal angles 230-1, 230-2, 230-3, 230-4. For example, the up-left diagonal surface and the up-right diagonal surface may be oriented at equal diagonal angles relative to the center surface 214. The down-left diagonal surface and the down-right diagonal surface may be oriented at equal diagonal angles that are the same as the those of the up-left diagonal surface and the up-right diagonal surface. In some embodiments, the diagonal angle is in a range having an upper value, a lower value, or upper and lower values including any of 10°, 15°, 20°, 25°, 30°, or any values therebetween. In some examples, the diagonal angle is greater than 10°. In some examples, the diagonal angle is less than 30°. In some examples, the diagonal angle is between 10° and 30°. In some examples, the diagonal angle is between 15° and 25°.

In some embodiments, a top edge 228 of the cardinal surface 220-1, 220-2, 220-3, 220-4 stands proud from the top edge 228 of the diagonal surfaces 222. The top edge 228 of the cardinal surface 220-1, 220-2, 220-3, 220-4 and the diagonal surface 222 is the point that is at the topmost location on the top side of the body 214 of the directional control pad 208. In some embodiments, the relief 234-1, 234-2, 234-3, 234-4 between the top edge 228 of the cardinal surfaces 220-1, 220-2, 220-3, 220-4 and the diagonal surfaces 222 is the same for all of the cardinal surfaces 220-1, 220-2, 220-3, 220-4 and adjacent diagonal surfaces 222. In some embodiments, the relief 234-1, 234-2, 234-3, 234-4 is in a range having an upper value, a lower value, or upper and lower values including any of 0.25 millimeters (mm), 0.50 mm, 0.75 mm, 1.0 mm, 1.25 mm, 1.5 mm, 1.75 mm, 2.0 mm, or any values therebetween. In some examples, the relief 234-1, 234-2, 234-3, 234-4 is greater than 0.25 mm. In some examples, the relief 234-1, 234-2, 234-3, 234-4 is less than 2 mm. In some examples, the relief 234-1, 234-2, 234-3, 234-4 is between 0.25 mm and 2.0 mm. In some examples, the relief 234-1, 234-2, 234-3, 234-4 is about 1.0 mm.

When a directional surface of the directional control pad is depressed relative to a face of the controller, the top edge of the cardinal surfaces and/or the diagonal surfaces approaches the face. The top edge must remain at least equal with or above the face when the directional control pad is depressed, otherwise the face of the controller may interfere with a user's ability to provide directional inputs. In embodiments where the face of the controller is not flat across the width of the opening in which the directional control pad is positioned, the directional control pad may be asymmetrical. For example, the cardinal angles of the left cardinal surface and the right cardinal surfaces may be different. In other examples, the cardinal angles of three of the four cardinal surface may be the same while one of the cardinal surfaces is oriented at a different angle from the center surface.

In some embodiments, the asymmetry of the directional control pad is based upon the geometry of the face of the controller. Referring now to the side cross-sectional view of a controller 300 in FIG. 7, in some embodiments, a face relief 336-1, 336-2 of the top edge 328 of the cardinal surfaces 320-1, 320-2 above the face 304 of the controller 300 is equal for each of the cardinal surfaces 320-1, 320-2 even when the face 304 is asymmetrical. Because the face relief 336-1, 336-2 of the cardinal surfaces 320-1, 320-2 remains the same relative to the changing face 304, the height of the top edges 328 relative to the body 314 of the directional control pad 308 and/or the cardinal angles 330-1, 330-2 may be different between the different cardinal surfaces 320-1, 320-2.

Figure 7:
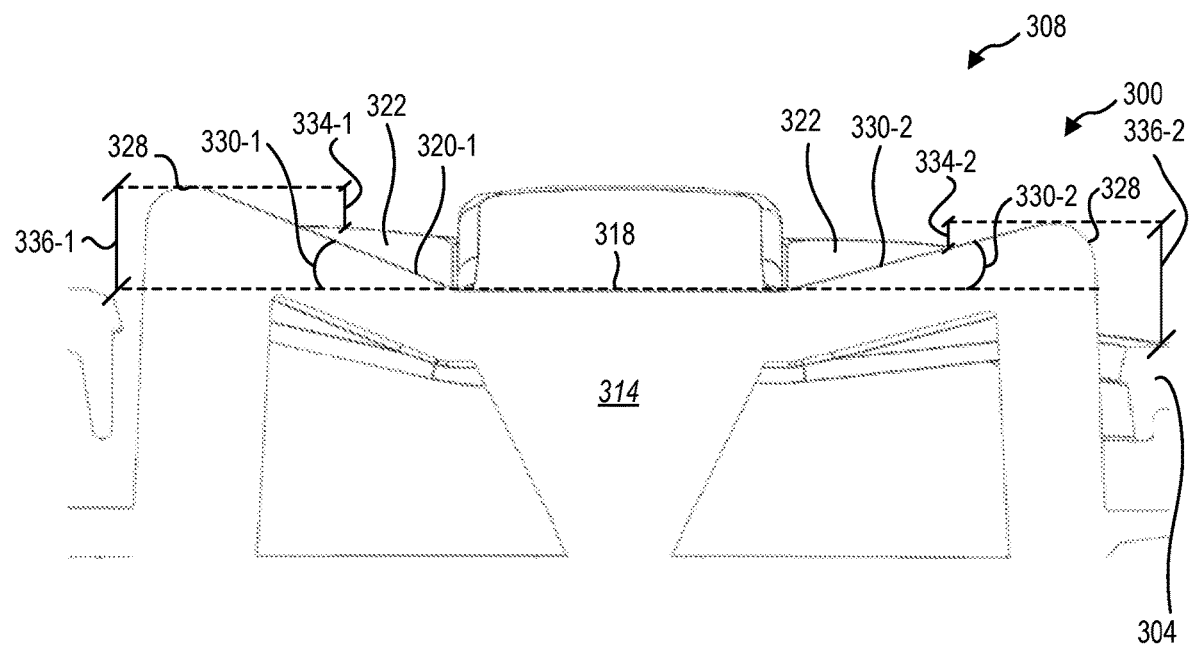
FIG. 7 is a side cross-sectional view of another directional control pad, according to at least some embodiments of the present disclosure.

For example, the embodiment illustrated in FIG. 7 has an up cardinal surface 320-1 with an up cardinal angle 330-1 that is greater than the down cardinal angle 330-2 of the down cardinal surface 320-2. In at least one embodiment, the up cardinal angle 330-1 is about 22°, and the down cardinal angle 330-2 is about 15°. An up cardinal angle 330-1 that is greater than the down cardinal angle 330-2 may provide greater leverage for a user to depress the up cardinal surface 320-1 using a rocker playstyle. However, maintaining the face relief 336-1, 336-2 above the face 304 of the controller 300 provides consistent tactile feedback for a presser playstyle.

In some embodiments, the top edges 328 of the diagonal surfaces 322 are similarly dependent on the face 304 of the controller 300 as the relief 334-1, 334-2 between the top edges 328 of the cardinal surfaces 320-1, 320-2 and the top edges 328 of the diagonal surfaces 322 remains constant. Maintaining consistent relief 334-1, 334-2 between the top edges 328 of the cardinal surfaces 320-1, 320-2 and the top edges 328 of the diagonal surfaces 322 allows for consistent and predictable tactile feedback to a sweeper playstyle.

Figures 1, 8:
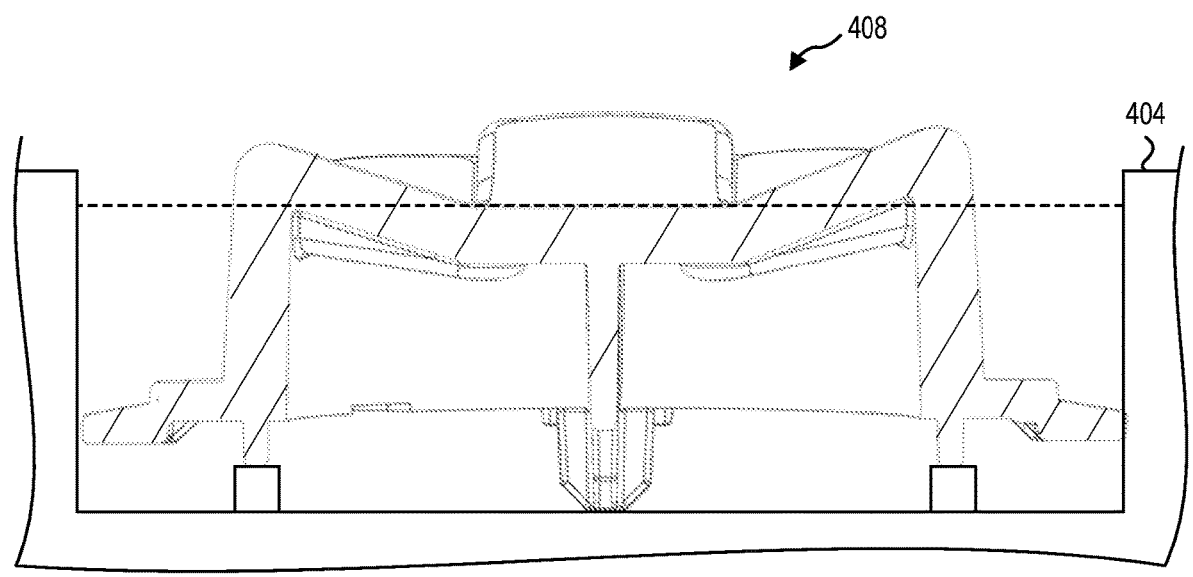
Figures 2, 8:
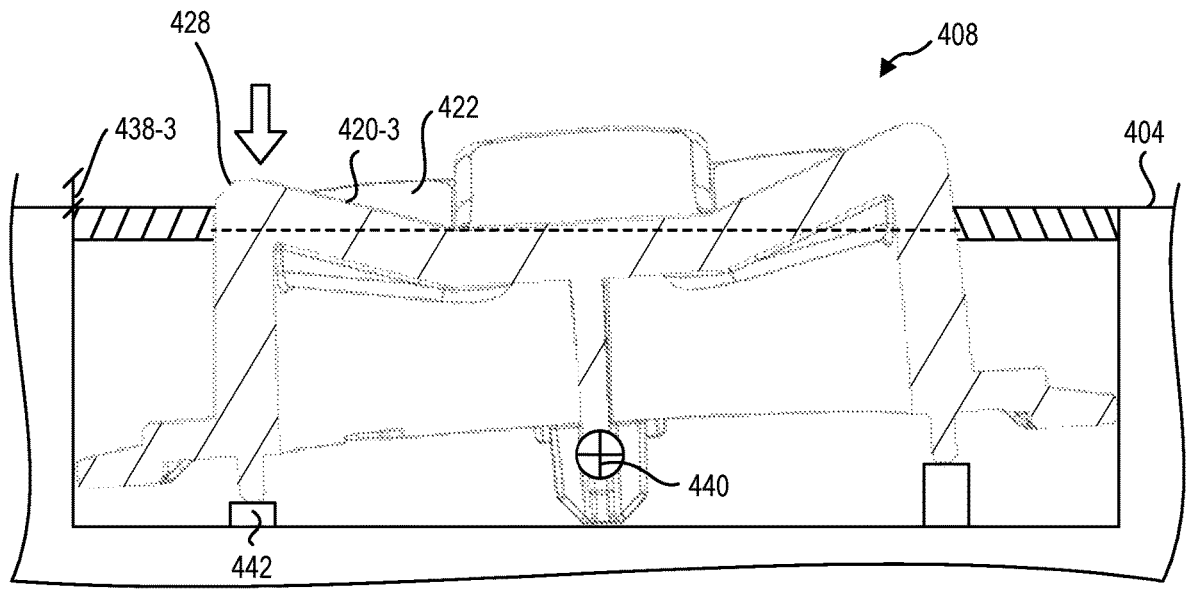
Figures 3, 8:
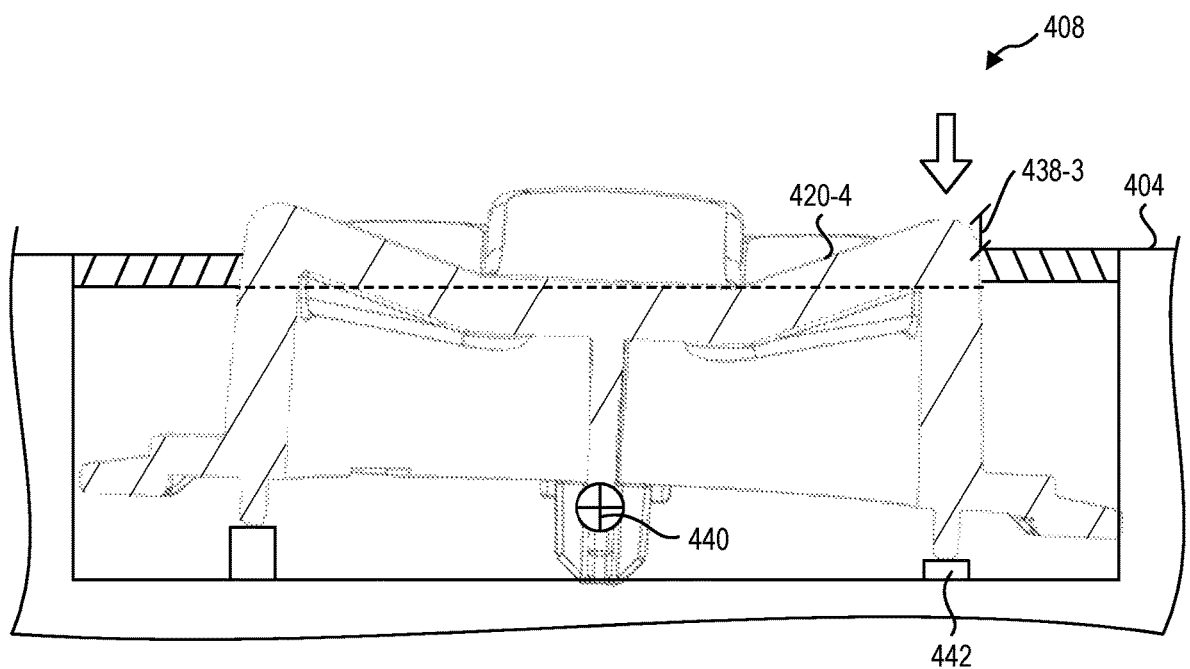

In some embodiments, in addition to maintaining the face relief 336-1, 336-2 above the face 304 of the controller 300 for a presser playstyle, a depressed relief may be consistent between cardinal surfaces 320-1, 320-2 to provide consistent tactile feedback for a presser playstyle or a sweeper playstyle. FIG. 8-1 through 8-3 illustrate the movement of a directional control pad 408 relative to a controller face 404, according to some embodiments of the present disclosure, in a front cross-sectional view.

FIG. 8-1 illustrates a directional control pad 408 in a neutral position relative to the face 404. In some embodiments, a face relief of the cardinal is related to the range of motion of the directional control pad 408 when depressed relative to the face of the controller. Referring now to FIG. 8-2, the depressed face relief 438-3, 438-4 determines how much contact the user's thumb may experience with the face 404 when depressing the cardinal surface 420-1, 420-2 and/or the diagonal surface 422 on the top edge 428. In some embodiments, the depressed face relief 438-3, 438-4 is equal for the center of each top edge 428 for all four cardinal surfaces irrespective of the face relief when the directional control pad 408 is in a neutral position. When a user applies force to the left cardinal surface 420-3, the directional control pad 408 tilts relative to the face 404 around a pivot point 440 of the directional control pad 408. The directional control pad 408 depressed a switch 442, activating the switch 442, and communicating the directional input.

In some embodiments, the range of motion of the switches 442, and hence the range of motion of the directional control pad 408 around the pivot point 440 is different between different switches. For example, as described herein, a user's thumb may have less range of motion away from the user's hand, and the "throw" or range of motion of the right direction switch, depressed in FIG. 8-3, may be less than the range of motion of the left directions switch, shown depressed in FIG. 8-2. A cardinal surface that experiences greater motion during depression may have greater face relief in the neutral position of the directional control pad 408, such that the depressed position exhibits the same depressed face relief 438-3, 438-4 between the top edge 428 and the face 404 of the controller when each cardinal surface 420-3, 420-4 is pressed by a user.

INDUSTRIAL APPLICABILITY

The present disclosure relates generally to systems and methods for providing user inputs to an electronic device. More particularly, the input devices described herein are configured to allow directional inputs to a computing device or a specialized video game console. In some embodiments, an input device according to the present disclosure is an electronic device controller that may be in data communication with an electronic device, such as a personal computer or video game console. In some embodiments, a controller is in data communication via a wired data connection. In other embodiments, the controlled is in wireless data communication.

In some embodiments, an electronic device controller includes a plurality of other input buttons located on a face of the controller with the directional input devices. The directional input devices may include one or more analog thumbsticks and/or one or more directional control pads. The controller may further include one or more menu or system buttons, shoulder buttons, trigger buttons, rear paddles, etc. In some embodiments, the directional control pad is positioned for a user to reach the directional control pad with a thumb.

In some embodiments, the directional input devices are available to be used interchangeably by a user, and in such embodiments, the directional control pad may be selected by the user to provide more precise, discrete directional inputs as compared to the analog thumbstick(s). The design, surface geometry, and tactile feedback of the directional control pad according to the present description, therefore, provide the most different types of users with improved performance.

A directional control pad according to the present disclosure has a body with a top side that is pressed by the user. In some embodiments, the body is a cylindrical body with a circular top side. In other embodiments, the body has other cross-sectional shapes, such as an oval, a rounded square, an octagon, or other shapes that facilitate eight-way directional inputs. When the user presses on the different surfaces of the top side, the directional control pad tilts in the controller and transmits the movement of the directional control pad to activate one or more switches and/or sensor in the controller and detect the user input.

In some embodiments, a directional control pad according to the present disclosure has a center surface on the top side of the body with a plurality of cardinal surfaces located around the center surface. The four cardinal surfaces are positioned at the up, down, left, and right directions relative to the center surface and are each oriented at an angle to the center surface such that the center surface is recessed into the body relative to the cardinal surfaces on the top side. The top side further includes four diagonal surfaces that are positioned angularly between the cardinal surfaces around the center surface. The diagonal surfaces are also oriented at an angle relative to the center surface such that the center surface is recessed into the body relative to the diagonal surfaces on the top side. The diagonal surfaces are partially recessed from the cardinal surfaces.

The up cardinal surface, down cardinal surface, left cardinal surface, and right cardinal surface each connect to the center surface at a discontinuity or other corner between the surfaces such that the center surface and cardinal surfaces do not form a smooth or continuous surface. The discontinuity between the center surface and the cardinal surfaces allows tactile feedback to a user when the user's thumb (or other finger) is positioned on the directional control pad. By tactilely identifying the discontinuities, the user can locate their thumb relative to the center surface on the directional control pad.

The diagonal surfaces of the directional control pad allow the user to press between the cardinal directions and provide direct pressure to the diagonal surface without needing to press on the two adjacent cardinal surfaces simultaneously as in some conventional directional control pads.

In some embodiments, the cardinal surfaces are all oriented relative to the center surface at equal cardinal angles. The left cardinal surface and the right cardinal surface may be oriented at equal cardinal angles relative to the center surface. The up cardinal surface and the down cardinal surface may be oriented at equal cardinal angles that are the same as the those of the left cardinal surface and the right cardinal surface. In some embodiments, the cardinal angle is in a range having an upper value, a lower value, or upper and lower values including any of 15°, 20°, 25°, 30°, 35°, or any values therebetween. In some examples, the cardinal angle is greater than 15°. In some examples, the cardinal angle is less than 35°. In some examples, the cardinal angle is between 15° and 35°. In some examples, the cardinal angle is between 20° and 30°.

In some embodiments, the diagonal surfaces are all oriented relative to the center surface at equal diagonal angles. The up-left diagonal surface and the up-right diagonal surface may be oriented at equal diagonal angles relative to the center surface. The down-left diagonal surface and the down-right diagonal surface may be oriented at equal diagonal angles that are the same as the those of the up-left diagonal surface and the up-right diagonal surface. In some embodiments, the diagonal angle is in a range having an upper value, a lower value, or upper and lower values including any of 10°, 15°, 20°, 25°, 30°, or any values therebetween. In some examples, the diagonal angle is greater than 10°. In some examples, the diagonal angle is less than 30°. In some examples, the diagonal angle is between 10° and 30°. In some examples, the diagonal angle is between 15° and 25°.

In some embodiments, a top edge of the cardinal surface stands proud from the top edge of the diagonal surfaces. The top edge of the cardinal surface and the diagonal surface is the point that is at the topmost location on the top surface of the body of the directional control pad. In some embodiments, the relief between the top edge of the cardinal surfaces and the diagonal surface is the same for all of the cardinal surfaces and adjacent diagonal surfaces. In some embodiments, the relief is in a range having an upper value, a lower value, or upper and lower values including any of 0.25 millimeters (mm), 0.5 mm, 0.75 mm, 1.0 mm, 1.25 mm, 1.5 mm, 1.75 mm, 2.0 mm, or any values therebetween. In some examples, the relief is greater than 0.25 mm. In some examples, the relief is less than 2 mm. In some examples, the relief is between 0.25 mm and 2.0 mm. In some examples, the relief is about 1.0 mm.

When a directional surface of the directional control pad is depressed relative to a face of the controller, the top edge of the cardinal surfaces and/or the diagonal surfaces approaches the face. The top edge must remain at least equal with or above the face when the directional control pad is depressed, otherwise the face of the controller may interfere with a user's ability to provide directional inputs. In embodiments where the face of the controller is not flat across the width of the opening in which the directional control pad is positioned, the directional control pad may be asymmetrical. For example, the cardinal angles of the left cardinal surface and the right cardinal surfaces may be different. In other examples, the cardinal angles of three of the four cardinal surface may be the same while one of the cardinal surfaces is oriented at a different angle from the center surface.

In some embodiments, the asymmetry of the directional control pad is based upon the geometry of the face of the controller. In some embodiments, a face relief of the top edge of the cardinal surfaces above the face of the controller is equal for each of the cardinal surfaces even when the face is asymmetrical. Because the face relief of the cardinal surfaces remains the same relative to the changing face, the height of the top edges relative to the body of the directional control pad and/or the cardinal angles may be different between the different cardinal surfaces. In some embodiments, the top edges of the diagonal surfaces are similarly dependent on the face of the controller as the relief between the top edges of the cardinal surfaces and the top edges of the diagonal surfaces remains constant.

In some embodiments, the face relief of the cardinal is related to the range of motion of the directional control pad when depressed relative to the face of the controller. The depressed face relief determines how much contact the user's thumb may experience with the face when depressing the cardinal surface and/or the diagonal surface on the top edge. In some embodiments, the depressed face relief is equal for the center of each top edge for all four cardinal surfaces irrespective of the face relief when the directional control pad is in a neutral position. For example, a cardinal surface that has greater face relief in the neutral position of the directional control pad may experience greater motion during depression, such that the depressed position exhibits the same depressed face relief between the top edge and the face of the controller when each cardinal surface is pressed by a user.

In some embodiments, a directional control pad according to the present disclosure allows users of different playstyles to experience improved control and comfort.

The present disclosure relates to systems and methods for providing directional inputs according to at least the examples provided in the sections below:

1. A directional control pad, the control pad comprising:
   a body;
   a center surface on a top side of the body;
   a plurality of a cardinal surfaces on the top side of the body and oriented at an angle to the center surface, wherein the cardinal surfaces connect to the center surface at a discontinuity; and
   a plurality of diagonal surfaces on the top side of the body and oriented at an angle to the center surface, wherein the cardinal surfaces are recessed below the cardinal surfaces.
2. The control pad of section 1, wherein the center surface is planar.
3. The control pad of any preceding section, wherein the cardinal surfaces are each planar.
4. The control pad of any preceding section, wherein the diagonal surfaces are each planar.
5. The control pad of any preceding section, wherein the cardinal surfaces are oriented at least 15° from the center surface.
6. The control pad of any preceding section, wherein the diagonal surfaces are oriented at least 15° from the center surface.
7. The control pad of any preceding section, wherein a first cardinal surface is oriented at a higher angle relative to the center surface than a second cardinal surface.
8. The control pad of any preceding section, wherein a first diagonal surface is oriented at a higher angle relative to the center surface than a second diagonal surface.
9. The control pad of any preceding section, wherein a top edge of the direction control pad is defined by the top edges of the cardinal surfaces and the diagonal surfaces and the top edge has less than 2 millimeters (mm) of relief between the cardinal surfaces and adjacent diagonal surfaces.
10. The control pad of any preceding section, wherein a first cardinal surface is oriented at a higher angle relative to the center surface than a second cardinal surface and a first relief between the first cardinal surface and an adjacent first diagonal surface is equal to a second relief between the second cardinal surface and an adjacent second diagonal surface.
11. An electronic device controller, the controller comprising:
    a housing having a face with an opening therein; and
    a directional control pad positioned in the opening and movable relative to the face to receive user inputs, the directional control pad including:
    a body,
    a center surface on a top side of the body,
    a plurality of a cardinal surfaces on the top side of the body and oriented at an angle to the center surface, wherein the cardinal surfaces connect to the center surface at a discontinuity, and
    a plurality of diagonal surfaces on the top side of the body and oriented at an angle to the center surface, wherein the cardinal surfaces are recessed below the cardinal surfaces.
12. The controller of section 11, wherein the directional control pad is asymmetrical in at least one direction.
13. The controller of sections 11 or 12, wherein the face is asymmetrical across the opening.
14. The controller of any of sections 11-13, wherein at least two cardinal surfaces of the plurality of cardinal surfaces have equal face reliefs between a top edge of the cardinal surfaces and the face.
15. The controller of any of sections 11-14, wherein at least two diagonal surfaces of the plurality of diagonal surfaces have equal face reliefs between a top edge of the diagonal surfaces and the face.
16. The controller of any of sections 11-15, wherein all reliefs between a top edge of the cardinal surfaces and adjacent diagonal surfaces are equal.
17. The controller of any of sections 11-16, wherein the depressed face reliefs between a top edge of the cardinal surfaces and the face of the controller are equal.
18. The controller of any of sections 11-17, wherein the center surface, each of the diagonal surfaces of the plurality of diagonal surfaces, and each of the cardinal surfaces of the plurality of cardinal surfaces are planar.
19. An electronic device controller, the controller comprising:
    a housing having a face with an opening therein;
    a switch positioned in the opening; and
    a directional control pad positioned in the opening and movable relative to the face around a pivot point to contact and activate the switch, the directional control pad including:
    a body,
    a center surface on a top side of the body,
    four cardinal surfaces on the top side of the body and oriented at an angle to the center surface, wherein each of the four cardinal surfaces connect to the center surface at a discontinuity with a cardinal angle and a first cardinal surface is oriented at a first cardinal angle and a second cardinal surface is oriented a second cardinal angle that is less than the first cardinal angle, and four diagonal surfaces on the top side of the body and oriented at an angle to the center surface, wherein the cardinal surfaces are positioned angularly between the four cardinal surfaces and recessed below the cardinal surfaces.

20. The controller of section 19, wherein the first cardinal angle is about 22° and the second cardinal angle is about 15°.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A directional control pad, the control pad comprising:
   a body;
   a center surface on a top side of the body;
   a plurality of a cardinal surfaces on the top side of the body and oriented at an angle to the center surface, wherein each of the cardinal surfaces connect to the center surface at a discontinuity and a first cardinal surface is oriented at a higher angle relative to the center surface than a second cardinal surface; and
   a plurality of diagonal surfaces on the top side of the body and oriented at an angle to the center surface, wherein the diagonal surfaces are recessed below the cardinal surfaces.

2. The control pad of claim 1, wherein the center surface is planar.

3. The control pad of claim 1, wherein the cardinal surfaces are each planar.

4. The control pad of claim 1, wherein the diagonal surfaces are each planar.

5. The control pad of claim 1, wherein the cardinal surfaces are oriented at least 15° from the center surface.

6. The control pad of claim 1, wherein the diagonal surfaces are oriented at least 15° from the center surface.

7. The control pad of claim 1, wherein a first diagonal surface is oriented at a higher angle relative to the center surface than a second diagonal surface.

8. The control pad of claim 1, wherein a top edge of the direction control pad is defined by the top edges of the cardinal surfaces and the diagonal surfaces and the top edge has less than 2 millimeters (mm) of relief between the cardinal surfaces and adjacent diagonal surfaces.

9. The control pad of claim 1, wherein a first cardinal surface is oriented at a higher angle relative to the center surface than a second cardinal surface and a first relief between the first cardinal surface and an adjacent first diagonal surface is equal to a second relief between the second cardinal surface and an adjacent second diagonal surface.

10. An electronic device controller, the controller comprising:
    a housing having a face with an opening therein; and
    a directional control pad positioned in the opening and movable relative to the face to receive user inputs, the directional control pad including:
    a body,
    a center surface on a top side of the body,
    a plurality of a cardinal surfaces on the top side of the body and oriented at an angle to the center surface, wherein each of the cardinal surfaces connect to the center surface at a discontinuity and a first cardinal surface is oriented at a higher angle relative to the center surface than a second cardinal surface, and
    a plurality of diagonal surfaces on the top side of the body and oriented at an angle to the center surface, wherein the diagonal surfaces are recessed below the cardinal surfaces.

11. The controller of claim 10, wherein the directional control pad is asymmetrical along at least one direction across the top side of the body.

12. The controller of claim 10, wherein the face is asymmetrical across the opening.

13. The controller of claim 10, wherein at least two cardinal surfaces of the plurality of cardinal surfaces have equal face reliefs between a top edge of the cardinal surfaces and the face.

14. The controller of claim 10, wherein at least two diagonal surfaces of the plurality of diagonal surfaces have equal face reliefs between a top edge of the diagonal surfaces and the face.

15. The controller of claim 10, wherein all reliefs between a top edge of the cardinal surfaces and adjacent diagonal surfaces are equal.

16. The controller of claim 10, wherein depressed face reliefs between a top edge of the cardinal surfaces and the face of the controller are equal.

17. The controller of claim 10, wherein the center surface, each of the diagonal surfaces of the plurality of diagonal surfaces, and each of the cardinal surfaces of the plurality of cardinal surfaces are planar.

18. An electronic device controller, the controller comprising:
- a housing having a face with an opening therein;
- a switch positioned in the opening; and
- a directional control pad positioned in the opening and movable relative to the face around a pivot point to contact and activate the switch, the directional control pad including:
  - a body,
  - a center surface on a top side of the body,
  - four cardinal surfaces on the top side of the body and oriented at an angle to the center surface, wherein each of the four cardinal surfaces connect to the center surface at a discontinuity with a cardinal angle and a first cardinal surface is oriented at a first cardinal angle and a second cardinal surface is oriented a second cardinal angle that is less than the first cardinal angle, and
  - four diagonal surfaces on the top side of the body and oriented at an angle to the center surface, wherein the cardinal surfaces are positioned angularly between the four cardinal surfaces and recessed below the cardinal surfaces.

19. The controller of claim 18, wherein the first cardinal angle is about 22° and the second cardinal angle is about 15°.

20. The controller of claim 18, wherein a first diagonal surface of the four diagonal surfaces is oriented at a different angle relative to the center surface than a second diagonal surface of the four diagonal surfaces.

\* \* \* \* \*